United States Patent
Lynar et al.

(10) Patent No.: US 11,643,010 B2
(45) Date of Patent: May 9, 2023

(54) VEHICLE DRIVER AND AUTONOMOUS SYSTEM COLLABORATION

(71) Applicant: International Business Machines Corporation, Armonk, NY (US)

(72) Inventors: Timothy M. Lynar, Dickson (AU); Jorge Andres Moros Ortiz, Melbourne (AU); John Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 16/522,262

(22) Filed: Jul. 25, 2019

(65) Prior Publication Data

US 2021/0023990 A1    Jan. 28, 2021

(51) Int. Cl.
*G01C 21/34* (2006.01)
*B60Q 9/00* (2006.01)
(Continued)

(52) U.S. Cl.
CPC ........... *B60Q 9/00* (2013.01); *G01C 21/3415* (2013.01); *G01C 21/3461* (2013.01); *G06N 5/04* (2013.01);
(Continued)

(58) Field of Classification Search
CPC .. B60Q 9/00; G01C 21/3415; G01C 21/3461; G01C 21/3691; G06N 5/04; G05D 1/0055; G05D 1/0214; G05D 2201/0213
See application file for complete search history.

(56) References Cited

U.S. PATENT DOCUMENTS

| 5,515,026 A | 5/1996 | Ewert |
| 7,761,227 B2 | 7/2010 | Kropp |

(Continued)

FOREIGN PATENT DOCUMENTS

| IN | 201641025927 | 9/2018 |
| JP | 2002251690 A | 9/2002 |

OTHER PUBLICATIONS

Anonymous, "System for assessing next worst driving consequences based on real time analysis of human behavior to alert/prevent potential emergency situation", IP.com No. IPCOM000254255D, IP.com Electronic Publication date: Jun. 14, 2018, 6 pages.

(Continued)

*Primary Examiner* — Truc M Do
(74) *Attorney, Agent, or Firm* — Scully, Scott, Murphy & Presser, P.C.; Peter J. Edwards

(57) ABSTRACT

A state of a driver operating a vehicle based at least on a rest pattern of the driver and a driver safety score and vehicle characteristic associated with the vehicle are determined. A risk of a planned route is received based on environment information. A safety risk for at least one location along the planned route is determined based on the received risk. Based on the safety risk, a use of available driver attention determined based on the state of the driver, possible modification of the planned route and vehicle state may be planned that minimize the safety risk. It may be determined that the driver is approaching a location along the planned route having a safety risk. Responsive to determining that the driver is approaching a location along the planned route having a safety risk, alert may be caused to be sent to the driver.

20 Claims, 4 Drawing Sheets

(51) Int. Cl.
*G06N 5/04* (2023.01)
*G01C 21/36* (2006.01)
*G05D 1/02* (2020.01)
*G05D 1/00* (2006.01)

(52) U.S. Cl.
CPC ....... *G01C 21/3691* (2013.01); *G05D 1/0055* (2013.01); *G05D 1/0214* (2013.01); *G05D 2201/0213* (2013.01)

(56) References Cited

U.S. PATENT DOCUMENTS

| | | |
|---|---|---|
| 8,634,980 B1 | 1/2014 | Urmson et al. |
| 8,781,669 B1 | 7/2014 | Teller et al. |
| 8,952,830 B2 | 2/2015 | Sims et al. |
| 9,344,683 B1 | 5/2016 | Nemat-Nasser et al. |
| 9,574,888 B1* | 2/2017 | Hu ..................... G01C 21/3461 |
| 9,623,874 B2 | 4/2017 | Baek et al. |
| 10,710,590 B2* | 7/2020 | Zheng .................. B60W 50/14 |
| 2003/0043045 A1* | 3/2003 | Yasushi ................. A61M 21/00 340/576 |
| 2006/0200008 A1* | 9/2006 | Moore-Ede ............ B60K 28/06 128/920 |
| 2012/0179363 A1 | 7/2012 | Pierfelice |
| 2013/0006469 A1 | 1/2013 | Green et al. |
| 2013/0021148 A1 | 1/2013 | Cook et al. |
| 2015/0260531 A1 | 9/2015 | Ehsani et al. |
| 2016/0001781 A1* | 1/2016 | Fung ..................... G16H 50/20 701/36 |
| 2016/0055764 A1 | 2/2016 | Kujala et al. |
| 2017/0154394 A1* | 6/2017 | Kan .................... G06Q 10/0635 |
| 2017/0270617 A1 | 9/2017 | Fernandes et al. |
| 2017/0355377 A1* | 12/2017 | Vijaya Kumar ...... B60W 40/08 |
| 2019/0113353 A1* | 4/2019 | Shimizu .............. B60W 50/082 |

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

VEHICLE DRIVER AND AUTONOMOUS SYSTEM COLLABORATION

BACKGROUND

The present application relates generally to computers and computer applications, autonomous vehicles, semiautonomous vehicles, and more particularly to vehicle driver and autonomous vehicle collaboration based on driver state and risk prediction toward reducing driving risks.

Driving a large vehicle such as a truck can be difficult. Continuous driving or a long period of driving of such a vehicle can compound strain placed on the driver, possibly compromising safety of the driver and others around the vehicle.

BRIEF SUMMARY

A computer-implemented method, in one aspect, may include determining a state of a driver operating a vehicle based at least on a rest pattern of the driver and a driver safety score. The method may also include determining vehicle characteristic associated with the vehicle. The method may further include receiving a risk of a planned route based on environment information. The method may also include predicting a safety risk for at least one location along the planned route based on the received risk. The method may also include, based on the safety risk, planning a use of available driver attention determined based on the state of the driver, possible modification of the planned route and vehicle state that minimize the safety risk. The method may further include determining that the driver is approaching a location along the planned route having a safety risk. The method may also include, responsive to determining that the driver is approaching a location along the planned route having a safety risk, causing an alert to the driver.

A system, in one aspect, may include a hardware processor. A memory may be coupled to the hardware processor. The hardware processor may be operable to determine a state of a driver operating a vehicle based at least on a rest pattern of the driver and a driver safety score. The hardware processor may be further operable to determine vehicle characteristic associated with the vehicle. The hardware processor may be further operable to receive a risk of a planned route based on environment information. The hardware processor may be further operable to predict a safety risk for at least one location along the planned route based on the received risk. The hardware processor may be further operable to, based on the safety risk, plan a use of available driver attention determined based on the state of the driver, possible modification of the planned route and vehicle state that minimize the safety risk. The hardware processor may be further operable to determine that the driver is approaching a location along the planned route having a safety risk. The hardware processor may be further operable to, responsive to determining that the driver is approaching a location along the planned route having a safety risk, cause an alert to the driver.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
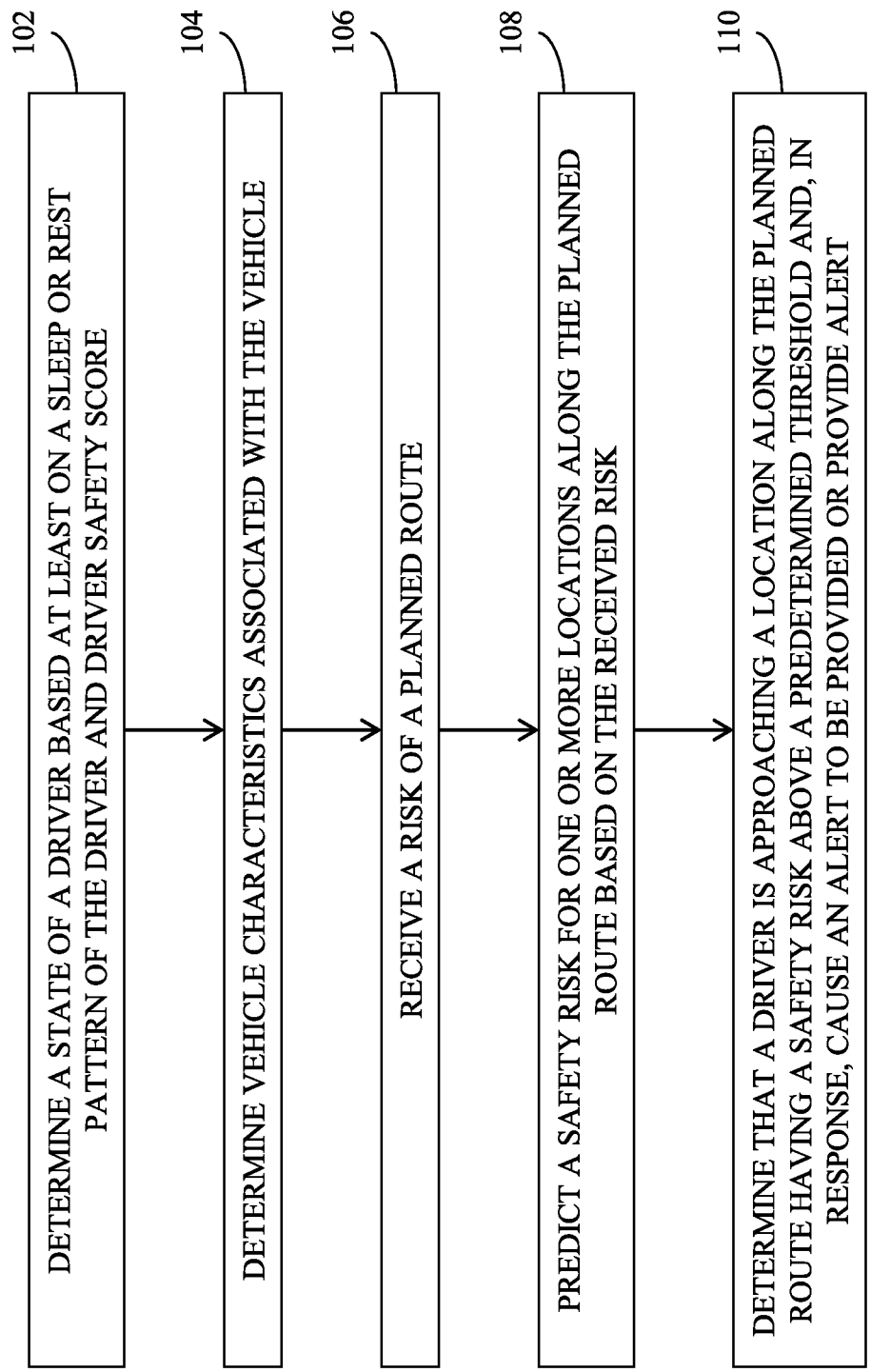
FIG. 1 is a diagram illustrating a method for attention management while driving, in an embodiment.

A system, method and technique can be provided, for allowing a semi-automatic or autonomous vehicle such as a truck to collaborate with the driver to reduce a driving risk. In some embodiments, a system may find alternative routes based on the state of the driver and other drivers in the neighborhood of the vehicle. The system may consider weather conditions, other environment conditions, road conditions, length of driving, the load of the vehicle, roads ahead and length of those roads ahead, predicted length of sleep or rest (from previous data, so that the length of sleep or rest can be used to negotiate with the driver as to how long they will sleep and what routes can be taken by the vehicle), the risk associated with the roads ahead, and the cost of each route in terms of trip duration. The system in some embodiments may treat driver focus or driver's awareness as a scarce resource that is to be conserved and used when most valuable.

In some embodiments, the system may treat this driver focus as a resource that needs a lead in time. The system can determine and recommend, when an autonomous or semi-autonomous vehicle should take control, one or more roads the vehicle should take, and also when the driver or user should take breaks or rests to regain focus. The system, for example, determines or identifies a driver physiological condition and those of the environment and/or road, to select one or more alternative routes on which the driver can share control with the semi-autonomous or autonomous vehicle and/or rest while the autonomous vehicle takes control.

One or more techniques described in co-owned U.S. patent application Ser. No. 16/153,963 filed on Oct. 8, 2018 and entitled, "Driving state within a driving environment that includes autonomous and semiautonomous vehicles" can be used to determine or identify one or more risks associated with the roads ahead. That application is incorporated herein by reference in its entirety.

In some embodiments, the system allows for collaboration between a driver and an autonomous or semi-autonomous vehicle (e.g., a computer or controller controlling the vehicle). The collaboration can be based on the driver state (e.g., physiological state) and risk prediction considering various environment factors, so as to reduce possible driving risks.

In some embodiments, the system may consider the following aspects in allowing or recommending such collaboration, and/or taking a controllable action for collaboration. Driver state: for example, the length of time or period the driver has been driving (e.g., continuously); the amount of seep (e.g., in terms of time duration) the driver had in the previous night (or day), which can be inferred from one or more devices such as the Internet of Things (IoT) devices, wearable devices and/or devices installed in the vehicle; the quality of driving, for example, in terms of adhering to road rules and this qualify as compared or related to previous driving quality or history of driving quality associated with the driver or cohort of drivers.

In relation to the vehicle such as a truck and the trip, the system can take into account the length of the vehicle, the weight of the vehicle, the quality of the vehicle (e.g., obtained from road checkups), risk associated with the road, e.g., in terms of high risk areas derived from driving data and traffic data, and correlated with the current and predicted weather at the time the driver is predicted to approach this road, e.g., time of the day (e.g., day or night, peak time), week (e.g., weekends can be busier), and year (e.g., major holidays).

In some embodiments, the system can be applicable in large vehicle driving for commercial use and can take into account the driver state and specific conditions about the vehicle and the trip. The system may then plan the route and modify the vehicle (directly or indirectly) to maintain the desired rate of use of attention, for example, both planning and controlling the use of attention through the trip. For instance, the amount of driver attention may be expressed in terms of duration, time and level of focus and the vehicle may be controlled to be selectively autonomous considering the available driver attention.

In some embodiments, the system may use an optimization technique such as a mixed integer programming or another available or known optimization technique. In such embodiments, the objective function can be to optimize the total amount of driver awareness required to complete the trip or trip segment, and the constraints can be the data described above, for example, including the state of the driver and other drivers in the neighborhood of the vehicle, weather conditions, other environment conditions, road conditions, length of driving, the load of the vehicle, roads ahead and length of those roads ahead, length of sleep or rest anticipated by the system or negotiated with the driver, routes taken by the vehicle, the risk associated with the roads ahead, and the cost of each route in terms of trip duration.

The system can provide feedback to the driver via a sensory mechanism such as, but not limited to, haptic, audio, visual activations. For instance, such feedback may be delivered based on a criterion, for example, based on determining that the driver is not performing a maneuver that requires a predetermined threshold amount of cognitive load. For instance, the system may offer the feedback in straight roads. The system can also provide feedback to the driver through a modification to the assistance provided to non electronically assisted controls, and/or through the use of one or more of lights, rumblers, shakers, and other actuators, for example, used in the automotive industry.

In some embodiments, the system can enhance the predictability of assistive driving systems based on one or more predicted risks, and can inform the driver and act accordingly. An assistive driving system, for example, may be a computer or electronic system that helps a vehicle driver while driving, for example, to increase road safety and/or driving safety, and may include one or more safety features such as collision avoidance, lane departure warning system, blind spot warning, and/or other features.

In some embodiments, the system can alert one or more road authorities of potential high risk "times" according to one or more predictions so that an action plan such as rerouting, or being alert can be put to practice. As an example use case, for semi-autonomous and autonomous manufacturers of large vehicles, the system can contribute to ensure safety of the roads and the safety of the drivers. As another example, insurances companies can use the data produced in the system to be aware of the advice given to the driver and the decisions taken. Such data can also provide an understanding of how drivers interact with an assistive driving system toward reducing one or more risks of driving or being on the road.

In some embodiments, the system can plan the use of driver attention, route and vehicle state such that a predicted safety is optimized while one or more time constraints are met. An example of a vehicle state can be the speed of the vehicle. The system can estimate or determine the driver attention by considering the speed, path conditions of the route (e.g., corners, bends, and/or turns), predicted breaking rate, predicted vehicle interactions, predicted overtaking events, predicted probability of wildlife interactions, weather events, road works, road surface imperfections, and/or others.

In some embodiments, the system may use a set of road predictors of risk surrounding accidents, injury, and may modify the behavior of a vehicle, wherein the modification can change and/or limit the behavior of the vehicle such that the load on attention is controlled, for example, limited and/or maintained. The system may remove the modification after the risk condition is resolved. In some embodiments, data can be collected, which data is associated with such risks and machine (e.g., vehicle) use and can be used in possible training needed, for example, for drivers or others, which can reduce risk threshold and provide upskill training for the drivers and/or others involved. In some embodiments, the system may allow an operator with the ability to override the control which would have otherwise modified the behavior of the vehicle.

The system can be applicable for autonomous and semi-autonomous vehicles, for example, those which may need a driver as a supervisor. The attention of that driver can be optimally used to ensure they are in a position to intervene as needed.

FIG. 1 is a diagram illustrating a method for attention management while driving, in one embodiment. At 102, the method may include determining a state of a driver of a vehicle based at least on a sleep or rest pattern of the driver and a driver safety score. The sleep pattern of the driver can be obtained from one or more IoT and/or wearable devices. Other methods may be used to determine the sleep pattern. The driver safety score may be obtained from historical data or data stored indicating at least the driver's past compliance with road rules.

At 104, the method may include determining one or more vehicle characteristics associated with the vehicle. Examples of the vehicle characteristics can include, but are not limited to, vehicle length, vehicle weight, a maintenance record of the vehicle, and current speed of travel. Such characteristics can be obtained from history of records, and for example, one or more sensors. For example, the speed can be obtained via speedometer.

At 106, the method may include receiving a risk of a planned route based on environment information such as traffic data, current and predicted future weather data at locations along the planned route, and temporal information (e.g., time of day, day of week, holidays). The risk may be computed or estimated using a technique such as (but not limited to) a cognitive learning system. Driver states may be categorized using unsupervised learning from driver data and the driver states may be further analyzed using supervised learning to determine the sequences of driver states that predict an event (e.g., accident or another incident event). By way of example, a vehicle undergoing frequent lane changes at a particular speed in a particular density of traffic may not be an indicator of elevated risk. However, a vehicle travelling at the same speed and same frequency of lane changes but at a higher traffic density may be indicative of a higher risk in safety. Similarly, if the driver state indicates a lower level of cognitive ability (e.g., determined based on a measurable factor), then the total sequence of states (speed, driving pattern, cognitive ability) may be indicative of an elevated safety risk. The risk determination may periodically or iteratively process the data into a set of current states.

At 108, the method may include predicting a safety risk for the locations along the planned route based on the received risk. For instance, the received risk of the planned route at 106 can be combined with the particular characteristics of the vehicle and its driver to predict the safety risk for the locations along the planned route. By way of example, such prediction may be made by utilizing historical data of known risks, vehicle and driver characteristics. A supervised learning model such as a neural network model may be trained based on historical data as training data. A trained model can be run with the received risk and the characteristics of the vehicle and its driver as input for the trained model to predict or output the predicted safety risk.

An embodiment of an implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

In some embodiments, based on the safety risk associated with the locations along the planned route, and the availability of driver attention, the method may offer feedback to the driver, modify the vehicle behavior and/or the planned route. For example, based on the safety risk associated with the locations along the planned route, the method may plan a use of the available driver attention (e.g., determined based on the state of the driver), possible modification of the planned route and vehicle state that minimize the predicted safety risk.

At 110, the method may include determining that the driver is approaching a location along the planned route having a safety risk above a predetermined threshold and, in response, causing or providing alert to be sent to the driver to notify the driver that focus or attention is needed. For example, the alert can take the form of haptic or audiovisual feedback, or another notification. If driver attention is not available and yet the safety risk is above a predetermined threshold, the vehicle may be modified to operate autonomously with all or many of the safety features enabled, such as slow speed, skid control, automatic break system on, and/or others. In another aspect, the planned route can be modified such that the vehicle does not travel through the location where the safety risk is determined to be above the predetermined threshold when the driver attention is not available. Yet in another aspect, if driver attention is not available, the method may include recommending or suggesting that the driver take a break from driving, for instance, such as finding next available rest area and stopping the vehicle. The method may include understanding the driver physiological condition and those of the environment and/or the road, to select alternatives routes where the safety risk of such is low, e.g., such that the driver can share control with the system and have a resting period while the autonomous vehicle takes control. In some embodiments, the system may ask the driver to log or perform an attention test in order for the system to determine or baseline the driver's current condition, e.g., current attentiveness of the driver.

In some embodiments, data used in the system and method may be received in an opt-in/opt-out manner and can be saved in a secure manner in such as way that the data is not compromised. For example, blockchain and/or smart contract technology may be utilized in accessing and storing data.

Figure 2:
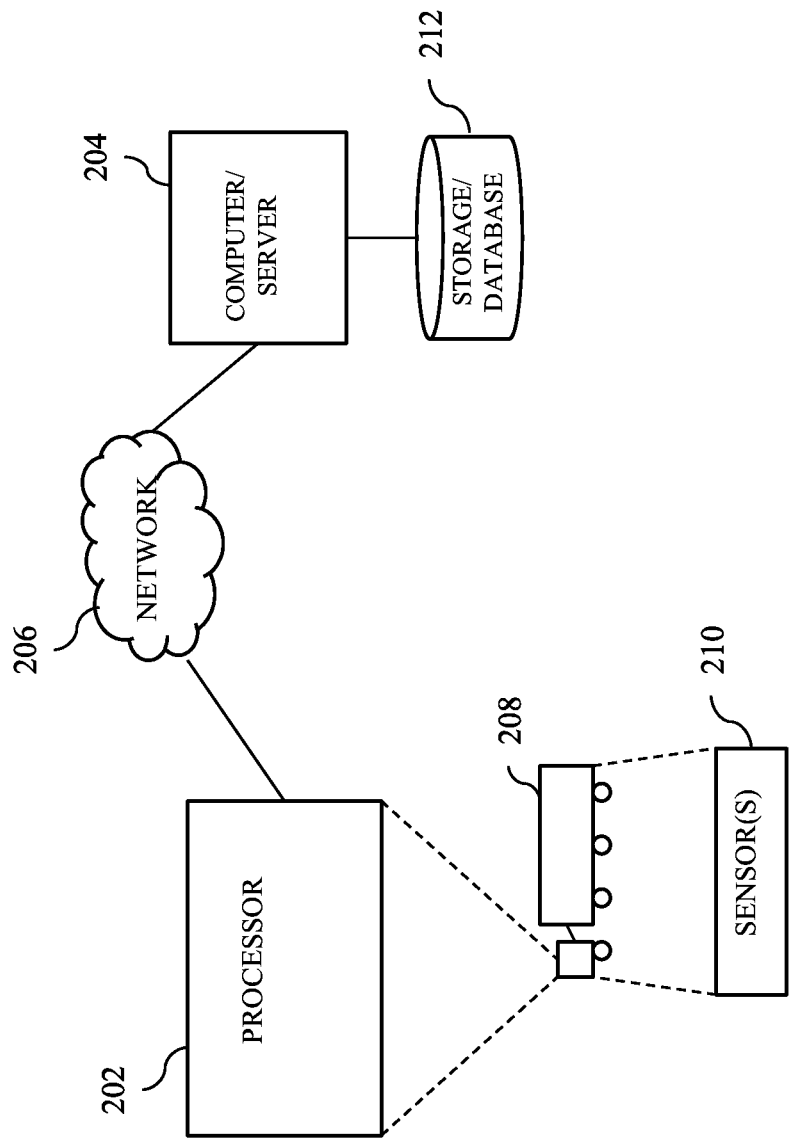
FIG. 2 is a diagram illustrating components of a system in an embodiment.

FIG. 2 is a diagram illustrating components of a system in one embodiment. The components shown may include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor 202 may execute a program of instructions to perform a method, for example, described with reference to FIG. 1, for instance, in communication with a remote system such as a remote computer or server 204 over a computer or communications network 206. The processor 202 may be a central processing unit (CPU), a graphics processing unit (GPU), a field programmable gate array (FPGA), an application specific integrated circuit (ASIC), another suitable processing component or device, or one or more combinations thereof, and may implement various functionalities associated with the methods and/or systems described herein. The processor 202 may be a part of a vehicle system, which may control the vehicle 208, for example, and communicate with one or more sensors 210 associated with the vehicle 208 for providing autonomous and/or semi-autonomous driving capability.

In determining whether and how to share control between the drive and the vehicle 208, the processor 202 may determine or estimate the current state of a driver of the vehicle 208 based at least on a sleep or rest pattern of the driver and a driver safety score. The sleep pattern of the driver can be obtained from one or more IoT and/or wearable devices, for instance, worn by the driver. Other methods may be used to determine the sleep pattern. The driver safety score may be obtained from historical data or data stored indicating at least the driver's past compliance with road rules, which may be received from one or more remote devices over a network 206, such as a computer or server 204. The computer or server 204 may further be coupled to a storage device 212, which may store a database of driver information, for example, including driver safety scores.

The processor 202 may also receive and/or determine one or more vehicle characteristics associated with the vehicle 202. Vehicle characteristics can be obtained from history of records, for example, received remotely from one or more computers 204 and/or storage devices 212. One or more vehicle characteristics can also be obtained from sensor readings from one or more sensors 210.

The processor 202 may further receive information associated with a risk of a planned route. The risk of the planned route may have been determined based on environment information such as traffic data, current and predicted future weather data at locations along the planned route, and temporal information (e.g., time of day, day of week, holidays). Such information may be received from a computer or server 204 or another device.

Based on the received risk, the processor 202 may predict a safety risk for the locations along the planned route. Using this safety risk for locations along the planned route and at least the amount of availability of driver attention, the processor 202 may determine a strategy that optimizes utilizing the driver attention and the autonomous and/or semi-autonomous capability of the vehicle. The strategy, for example, may include performing one or more actions. Examples of such an action may include, but are not limited to, modifying the vehicle behavior, alerting the driver, and/or modifying the planned route.

For example, the processor 202 may determine that the driver is approaching a location along the planned route having a safety risk above a predetermined threshold and, in response, cause an alert to be provided to the driver, for example, to notify the driver that focus or attention is needed. If driver attention is not available and yet the safety risk is above a predetermined threshold, the vehicle may be modified to operate autonomously with all or selected number of safety features enabled. In another aspect, the processor 202 may modify the planned route so that the vehicle does not travel through the location where the safety risk is determined to be above the predetermined threshold when the driver attention is not available. Yet in another aspect, if driver attention is not available, the processor 202 may find a nearest rest area, direct the vehicle or driver to the nearest rest area, and suggest taking a break from driving.

Figure 3:
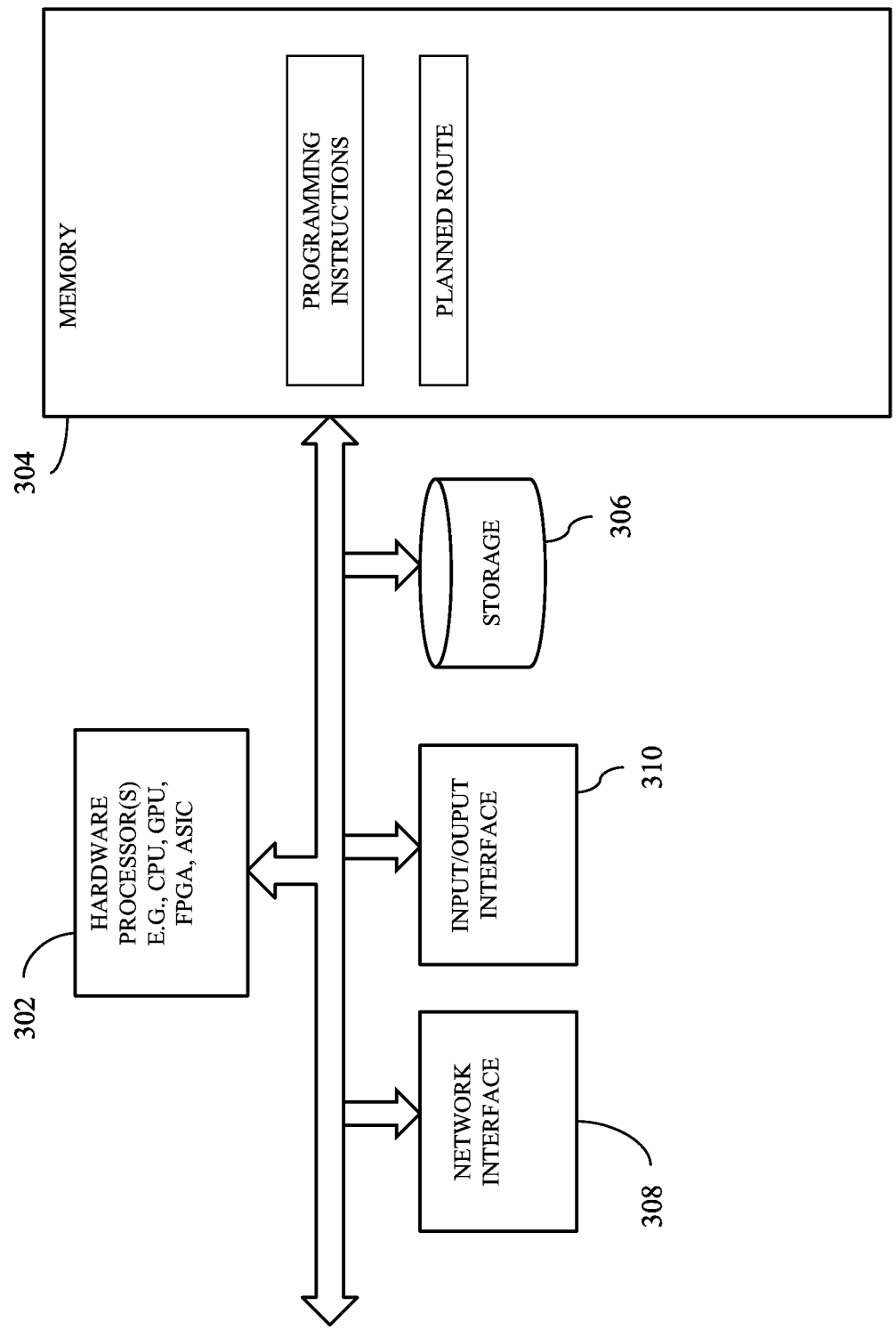
FIG. 3 is a diagram showing components of a system in an embodiment.

FIG. 3 is a diagram showing components of a system in one embodiment. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and determine safety risk associated with a planned route. A memory device 304 may include random access memory (RAM), read-only memory (ROM) or another memory device, and may store data and/or processor instructions for implementing various functionalities associated with the methods and/or systems described herein. One or more processors 302 may execute computer instructions stored in memory 304 or received from another computer device or medium. A memory device 304 may, for example, store instructions and/or data for functioning of one or more hardware processors 302, and may include an operating system and other program of instructions and/or data. One or more hardware processors 302 may receive input such as the rest pattern and driver safety score, vehicle characteristics and an estimated risk associated with a planned route. At least one hardware processor 302 may determine a safety risk for the locations along the planned route and generate a strategy for optimizing safety on the road. Some of the data utilized by one or more hardware processors 302 may be stored in a storage device 306 or received via a network interface 308 from a remote device, and may be temporarily loaded into a memory device 304. One or more hardware processors 302 may be coupled with interface devices such as a network interface 308 for communicating with remote systems, for example, via a network, and an input/output interface 310 for communicating with input and/or output devices such as a keyboard, mouse, display, and/or others.

Figure 4:
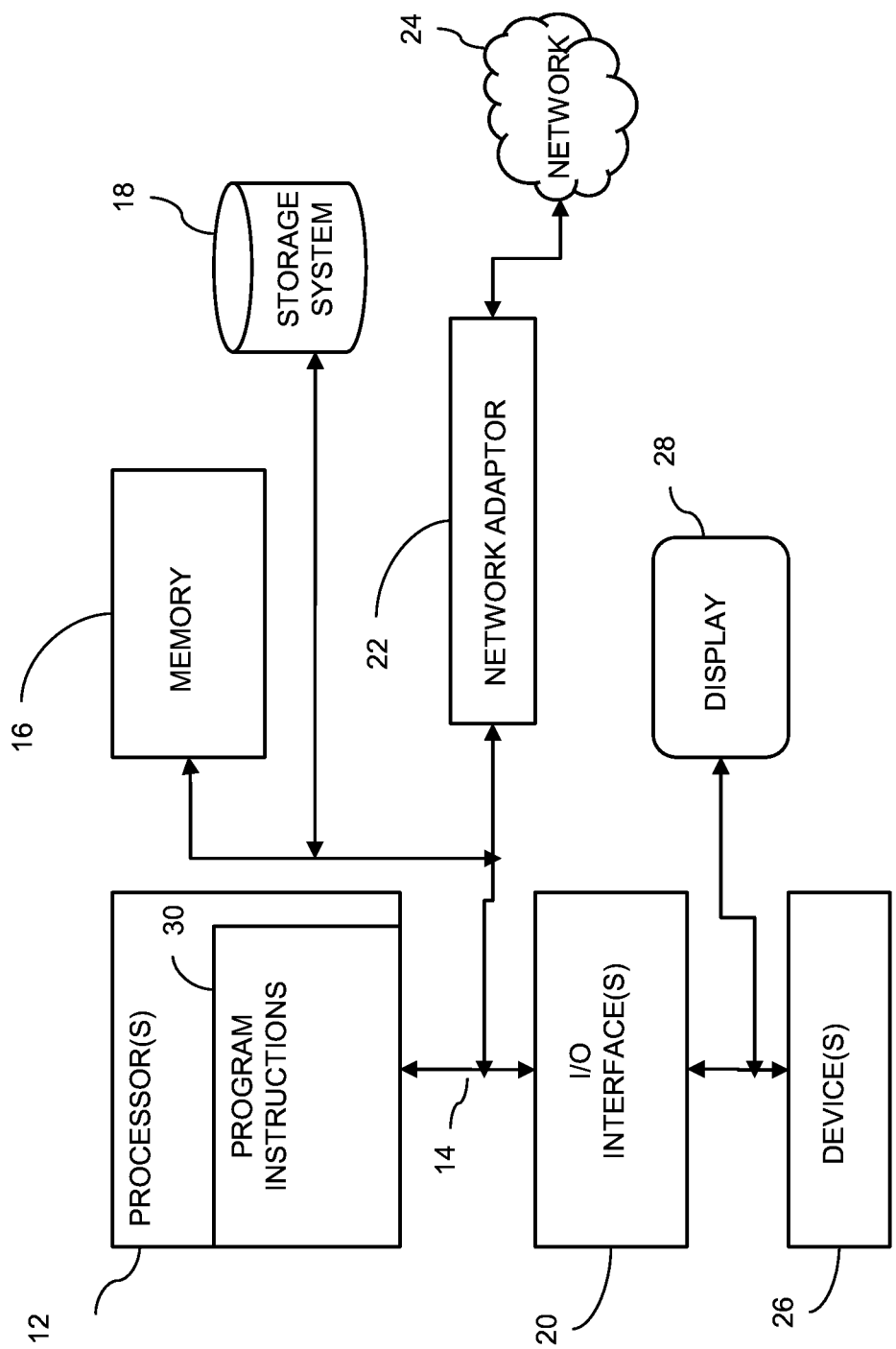
FIG. 4 illustrates a schematic of an example computer or processing system that may implement a system in an embodiment.

FIG. 4 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. So for example, unless otherwise stated explicitly, such terms can be interpreted as including "at least", e.g., "comprising at least", "including at least" and "having at least".

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
    determining a state of a driver operating a vehicle based at least on a rest pattern of the driver and a driver safety score;
    determining vehicle characteristic associated with the vehicle;
    receiving a risk of a planned route based on environment information;
    predicting a safety risk for at least one location along the planned route based on the received risk; and
    based on the safety risk, planning a use of available driver attention determined based on the state of the driver, possible modification of the planned route and vehicle state that minimize the safety risk,
    the planning of the use of available driver attention based on optimizing a total amount of driver attention needed to complete a trip by using an objective function with constraints that include at least the state of the driver, weather conditions, road conditions, length of driving, the load of the vehicle, roads ahead and length of the roads ahead, predicted length of the driver's rest time, routes taken by the vehicle, risk associated with the roads ahead, and a cost of each route in terms of trip duration, and the planning includes planning sharing of control between the driver and the vehicle that conserves the available driver attention.

2. The method of claim 1, further comprising:
    determining that the driver is approaching a location along the planned route having a safety risk; and
    responsive to determining that the driver is approaching a location along the planned route having a safety risk, causing an alert to the driver.

3. The method of claim 1, wherein the rest pattern includes at least the driver's sleep pattern.

4. The method of claim 1, wherein the rest pattern is determined based on data received from a plurality of Internet of Things (IoT) devices.

5. The method of claim 1, wherein the rest pattern is determined based on data received from a plurality of wearable devices.

6. The method of claim 1, wherein the driver safety score is determined based on the driver's compliance with road rules.

7. The method of claim 1, wherein the vehicle characteristic includes at least one of vehicle length, vehicle weight, maintenance record of the vehicle, and current speed of travel.

8. The method of claim 1, wherein the environment information includes at least one of traffic data, current and predicted future weather data at the at least one location along the planned route, and temporal information.

9. The method of claim 2, wherein the alert includes at least a haptic feedback.

10. The method of claim 2, wherein the alert includes at least an audiovisual feedback.

11. A system comprising:
    a hardware processor;
    a memory couple to the hardware processor;
    the hardware processor operable to at least:
        determine a state of a driver operating a vehicle based at least on a rest pattern of the driver and a driver safety score;
        determine vehicle characteristic associated with the vehicle;
        receive a risk of a planned route based on environment information;
        predict a safety risk for at least one location along the planned route based on the received risk; and
        based on the safety risk, plan a use of available driver attention determined based on the state of the driver, possible modification of the planned route and vehicle state that minimize the safety risk,
        the planning of the use of available driver attention based on optimizing a total amount of driver attention needed to complete a trip by using an objective function with constraints that include at least the state of the driver, weather conditions, road conditions, length of driving, the load of the vehicle, roads ahead and length of the roads ahead, predicted length of the driver's rest time, routes taken by the vehicle, risk associated with the roads ahead, and a cost of each route in terms of trip duration, and the planning includes planning sharing of control between the driver and the vehicle that conserves the available driver attention.

12. The system of claim 11, wherein the hardware processor is further operable to:
   determine that the driver is approaching a location along the planned route having a safety risk; and
   responsive to determining that the driver is approaching a location along the planned route having a safety risk, cause an alert to the driver.

13. The system of claim 11, wherein the rest pattern includes at least the driver's sleep pattern.

14. The system of claim 11, wherein the rest pattern is determined based on data received from a plurality of Internet of Things (IoT) devices.

15. The system of claim 11, wherein the rest pattern is determined based on data received from a plurality of wearable devices.

16. The system of claim 11, wherein the driver safety score is determined based on the driver's compliance with road rules.

17. The system of claim 11, wherein the vehicle characteristic includes at least one of vehicle length, vehicle weight, maintenance record of the vehicle, and current speed of travel.

18. The system of claim 11, wherein the environment information includes at least one of traffic data, current and predicted future weather data at the at least one location along the planned route, and temporal information.

19. A computer program product comprising a computer readable storage medium having program instructions embodied therewith, the program instructions executable by a device to cause the device to:
   determine a state of a driver operating a vehicle based at least on a rest pattern of the driver and a driver safety score;
   determine vehicle characteristic associated with the vehicle;
   receive a risk of a planned route based on environment information;
   predict a safety risk for at least one location along the planned route based on the received risk; and
   based on the safety risk, planning a use of available driver attention determined based on the state of the driver, possible modification of the planned route and vehicle state that minimize the safety risk,
   the planning of the use of available driver attention based on optimizing a total amount of driver attention needed to complete a trip by using an objective function with constraints that include at least the state of the driver, weather conditions, road conditions, length of driving, the load of the vehicle, roads ahead and length of the roads ahead, predicted length of the driver's rest time, routes taken by the vehicle, risk associated with the roads ahead, and a cost of each route in terms of trip duration, and the planning includes planning sharing of control between the driver and the vehicle that conserves the available driver attention.

20. The computer program product of claim 19, wherein the device is further caused to:
   determine that the driver is approaching a location along the planned route having a safety risk; and
   responsive to determining that the driver is approaching a location along the planned route having a safety risk, cause an alert to the driver.

* * * * *